Feb. 6, 1951

P. S. DICKEY 2,540,778

FURNACE CONTROL SYSTEM

Filed July 1, 1948

INVENTOR.
PAUL S. DICKEY
BY
Raymond H. Junkins
ATTORNEY

Feb. 6, 1951  P. S. DICKEY  2,540,778
FURNACE CONTROL SYSTEM
Filed July 1, 1948  2 Sheets-Sheet 2

INVENTOR.
PAUL S. DICKEY
BY
Raymond W. Junkin
ATTORNEY

Patented Feb. 6, 1951

2,540,778

UNITED STATES PATENT OFFICE 2,540,778

FURNACE CONTROL SYSTEM

Paul S. Dickey, East Cleveland, Ohio, assignor to Bailey Meter Company, a corporation of Delaware Application July 1, 1948, Serial No. 36,353

13 Claims. (Cl. 236—26)

This invention relates to control systems for furnaces, and more particularly to systems for controlling the operation of fluid fuel burners in a furnace so as to maintain its operating efficiency within a predetermined range.

It is desirable that the operating efficiency of a furnace be maintained at a high value. When the demand on a furnace is low, the efficiency of operation obtained with a small number of burners to which fuel and air is supplied under pressure is better than it is with a large number of burners each operating at a lower rate. If the pressure at which the fuel is supplied to the burners is increased with the increase in demand, the furnace will continue to operate at a high efficiency and satisfy the demand. A point may be reached, however, where the fuel is supplied at the maximum pressure available and the demand continues to increase. By cutting in additional burners at this time, the pressure of the fuel supply to the burners may be reduced considerably and still meet the demand with a high efficiency of operation. If the demand continues to increase after the fuel supply pressure has been increased again to the maximum value, still more burners may be cut into the system. As the demand drops off, some of the burners may be cut out so that the remaining burners will have fuel supplied to them at a pressure which results in a high efficiency of operation. To prevent a cutting of burners in and out on slight changes in demand, control means may be provided for cutting the burners out when the demand has dropped somewhat below the values at which they are cut in.

An object of my invention is to provide an improved control system for a furnace. Another object is to provide a system for controlling the operation of burners in a furnace so as to obtain a high operating efficiency. Still another object is to provide a furnace control system having means operating to cut burners in and out of a fuel supply line so as to satisfy the demand while providing a high efficiency of operation. Yet another object is to provide a control system operating to cut additional burners into the fuel line of a furnace as they are needed to satisfy the demand, and operating to cut them out again when the demand has dropped a predetermined amount below that existing when the burners were cut in. Other objects will appear in the course of the following description.

In the accompanying drawings there is shown one form which my invention may assume in practice.

Figure 1:
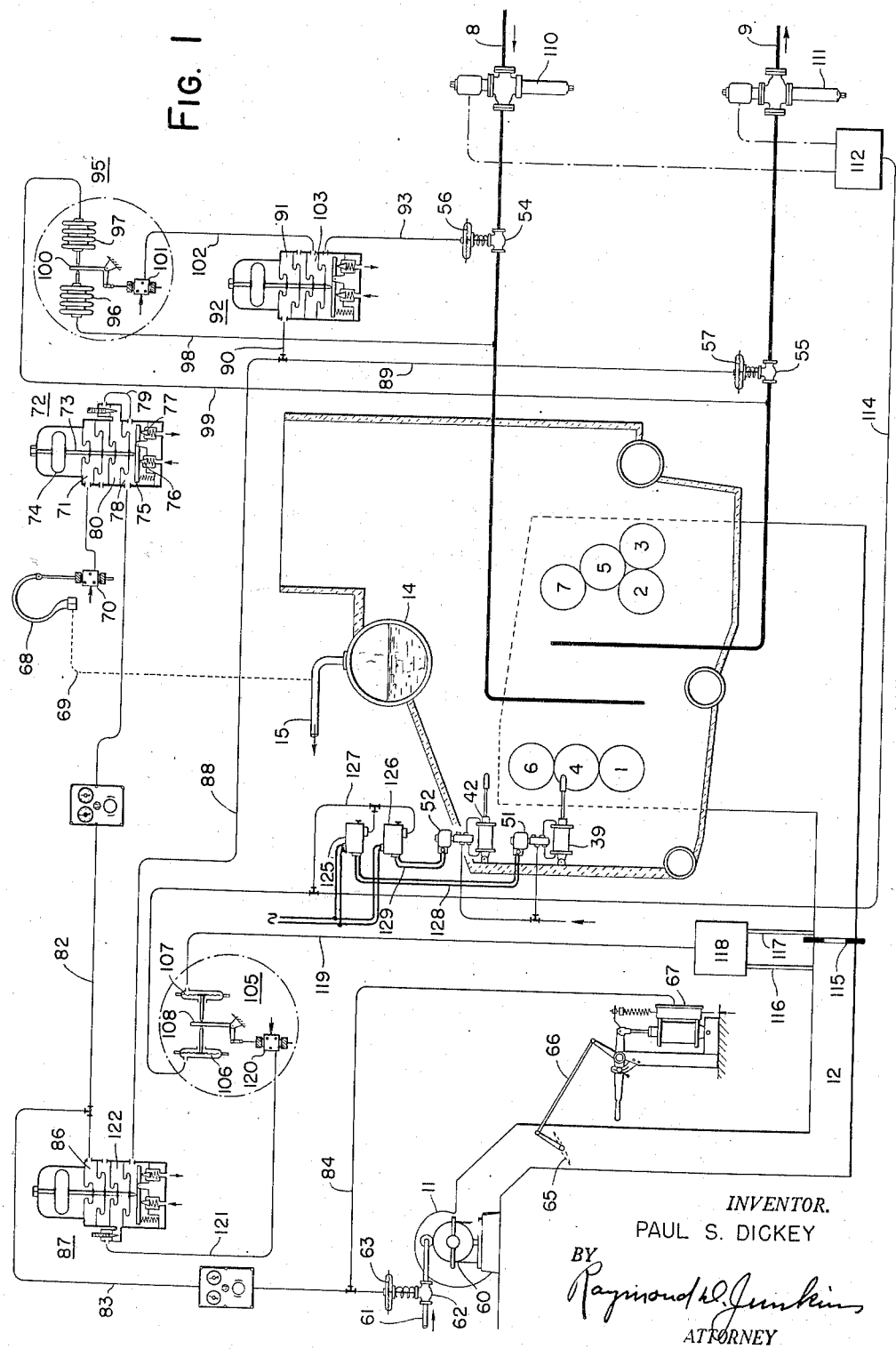
Fig. 1 is a schematic diagram showing my improved control system.

Referring to the system of Fig. 1 it will be noted that there is shown a furnace having burners numbered from 1 to 7, inclusive. A conduit 8 having fuel, such as oil, supplied thereto at a constant pressure, and a return conduit 9 are adapted to be connected in communication with the burners by a mechanism shown in Fig. 2 and shortly to be described. Air is supplied from a fan or blower 11 through a passage 12 to the furnace for supporting combustion of fuel discharged from the burners, and a boiler 14 is heated by the combustion of the fuel for generating steam which is delivered through a conduit 15 to a point of use. The pressure of the steam discharged from the boiler may be employed in this case as an indication of demand on the furnace, a drop in pressure indicating an increase in demand, and an increase in pressure indicating a decrease in demand. It will be appreciated that the furnace may be employed for heating something other than a boiler, and that the demand may be indicated by changes in temperature of some object or material heated.

Figure 2:
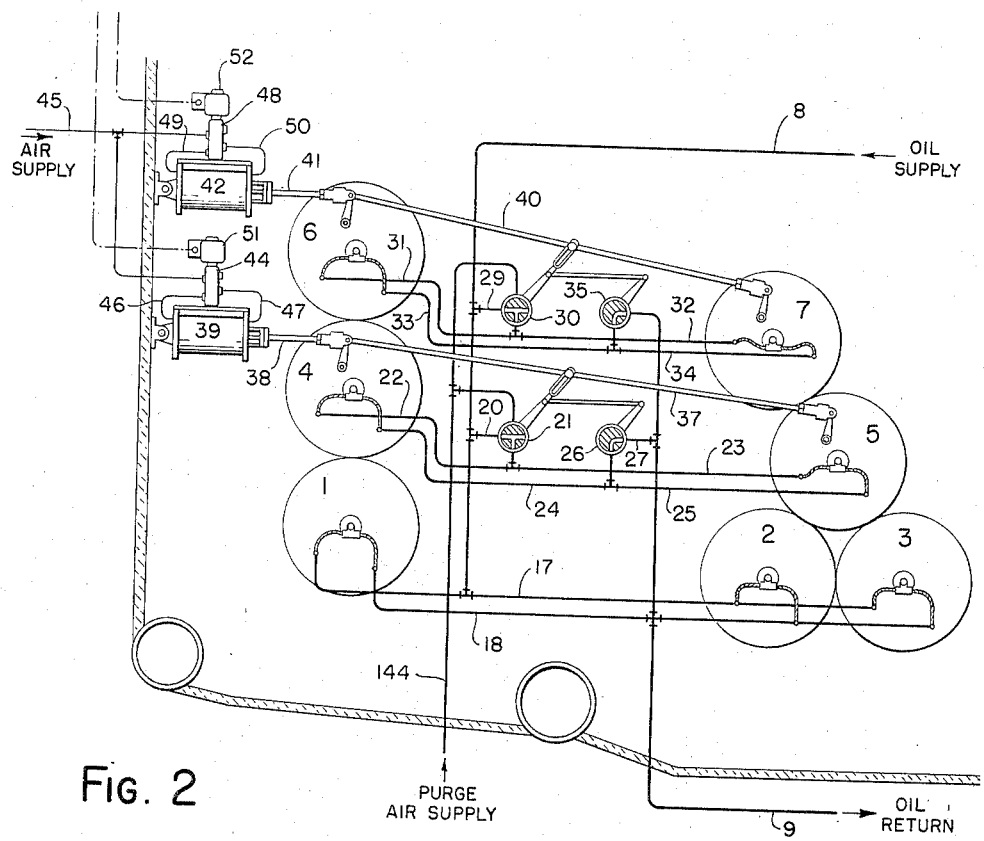
Fig. 2 is an enlarged view of the mechanism for cutting burners in and out of communication with fuel supply and return lines.

As shown in Fig. 2, the burners 1, 2 and 3 are connected continuously in communication with the oil supply conduit 8 and the return conduit 9 through conduits 17 and 18. The supply conduit 8 is adapted to be connected through a conduit 20 and a valve mechanism 21 to conduits 22 and 23 leading to the burners 4 and 5, and the discharge sides of these burners are connected through conduits 24 and 25 to a valve mechanism 26 having communication with the return line 9 through a conduit 27. The supply conduit 8 is also connected by a conduit 29 to a valve mechanism 30 which communicates through conduits 31 and 32 with the burners 6 and 7, and the discharge sides of these burners are connected by conduits 33 and 34 to a valve mechanism 35 which communicates with the return line 9. The valve mechanisms 21 and 26 are connected to a linkage mechanism 37 which is operatively connected to a piston rod 38 extending from one end of a cylinder 39, and the valve mechanisms 30 and 35 are connected to a linkage mechanism 40 which is connected in turn to a piston rod 41 extending from a cylinder 42. A valve mechanism 44 controls the connection of an air supply conduit 45 to conduits 46 and 47 leading to opposite ends of the cylinder 39, and a valve mechanism 48 controls the connection of the air supply conduit 45 to conduits 49 and 50 leading to opposite ends of the cylinder 42. Solenoids 51 and 52 are connected to the valve mechanisms 44 and 48 respectively, and are operative when energized to position the valve mechanisms for supplying air to the left hand ends of the cylinders so as to move the piston rods to the right and actuate the linkage mechanisms for opening the valves to supply fuel through the burners. When the solenoids 51 and 52 are deenergized, the valve mechanisms 44 and 48 operate to supply air from the conduit 45 through the conduits 47 and 50 to the right hand ends of the cylinders for moving the piston rods to close the valves 21, 26, 30 and 35.

Connected in the fuel supply conduit 8 and the return conduit 9, as shown in Fig. 1, are valves 54 and 55 which are controlled by pressure actuated diaphragms 56 and 57, respectively. The valve 54 is so designed that it is moved toward its open position as the pressure supply to the diaphragm 56 is increased, and the valve 55 is designed to close on an increase in the pressure supplied to the diaphragm 57.

The fan or blower 11 is driven by a power unit 60, such as a turbine, and a conduit 61 delivers operating fluid to the power unit under the control of a valve 62 which is adapted to be moved toward its open position by a diaphragm 63 when the pressure supplied thereto is increased. Arranged in the air passage 12 is a damper 65 connected by a link 66 to a control mechanism 67 which operates when pressure supplied thereto is increased, to move the damper toward its open position.

For controlling the supply of fuel and air to the burners in response to changes in demand on the furnace, there are provided means operating in response to changes in steam discharge pressure and regulating the pressures supplied to the diaphragms 56, 57, 63, and the control mechanism 67. This means comprises a pressure responsive device 68, such as a Bourdon tube, subjected to the steam pressure in the conduit 15 through a conduit 69. A pilot valve 70 is connected to the Bourdon tube and controls the supply of pressure fluid to a chamber 71 of a relay 72 for moving a member 73 against the action of a spring 74 to position a pivoted beam 75 which regulates fluid supply and discharge valves 76 and 77. The positions of these valves determines the pressure in a chamber 78 which communicates through a restricted connection 79 with an opposing chamber 80. When the pressure supplied to the chamber 71 balances the tension of the spring 74, the beam 75 assumes a position to close the supply and discharge valves, and the pressure in the chamber 78 is held at the value existing when the balance was reached. An increase in the pressure supplied to the chamber 71 results in an operation of the beam to open the supply valve and effect a continuing increase in the pressure in chamber 78. If the pressure in the chamber 71 drops below the value balancing the spring 74, the discharge valve 77 is opened to effect a continuing decrease in the pressure in the chamber 78. The relay 72 is disclosed in the Gorrie Patent Re. 21,804, and need not be described further herein.

The pilot valve 70 is connected so as to increase the pressure in the chamber 71 when the Bourdon tube operates on a drop in the steam pressure in the conduit 15. An increase in the steam pressure causes the Bourdon tube to position the pilot valve so as to reduce the pressure in the chamber 71. This pilot valve is like that described in the Johnson Patent 2,054,464.

The pressure in the chamber 78 of the relay is delivered through conduits 82 and 83 to the diaphragm 63, and is delivered through a branch conduit 84 to the control mechanism 67 for the damper. The pressure is also delivered from the conduit 82 to a chamber 86 in a relay 87 which operates to supply a pressure to a conduit 88 communicating with a branch conduit 89 leading to the diaphragm 57, and communicating with another branch conduit 90 leading to a chamber 91 in a relay 92 which controls the flow of pressure fluid through a conduit 93 to the diaphragm 56. An operation of the relay 72 to increase the pressure supplied to the conduit 82 results in an opening of the valve 62 to increase the speed of the turbine for driving the blower 11 to supply more air to the passage 12, an operation of the control mechanism 67 to open the damper 65, and an operation of the relay 87 to increase the pressure in the conduit 88 for effecting a closing movement of the valve 55 in the fuel return line 9. The pressure increase in the conduit 88 is also delivered through the conduit 90 to the relay 92 and causes it to operate so as to increase the pressure in the conduit 93 for opening the valve 54 in the fuel supply line.

As the valve 55 is closed and the valve 54 is opened, the pressures at the burner sides of these valves are increased so that more oil is forced through the burners to satisfy the demand on the furnace. It is desirable that the valves 54 and 55 be operated so that the ratio of the pressures at the supply and discharge sides of the burners is maintained at a predetermined value. For maintaining the desired ratio, there is provided a relay 95 having bellows 96 and 97 subjected through conduits 98 and 99 to the pressures at the supply and discharge sides, respectively, of the burners. The bellows operate against opposite sides of one arm of a bell crank 100, and another arm of the bell crank is connected to a pilot valve 101 controlling the supply of pressure fluid through a conduit 102 to a chamber 103 of the relay 92. The pressure supplied to the chamber 103 aids the pressure in the chamber 91 in operating the relay to determine the pressure supplied to the diaphragm 56.

If the pressure at the discharge side of the burners should increase for some reason more than the pressure increased at the supply side, the bellows 97 would operate to swing the bell crank 100 in a counterclockwise direction for actuating the pilot valve to increase the pressure supplied to the chamber 103. The relay 92 would be operated by this increased pressure to increase the pressure supplied through the conduit 93 to the diaphragm 56 for opening the valve 54 and increasing the pressure at the supply side of the burners. If the pressure at the discharge side did not increase as much as it did at the supply side, then the bellows 96 would operate the bell crank to position the pilot valve for reducing the pressure supplied to the chamber 103, and the relay 92 would operate to reduce the pressure on the diaphragm 56 for closing the valve 54 so as to reduce the pressure at the supply side of the burners. It will be appreciated that the bellows 96 and 97 may be positioned, as shown, to maintain a 1 to 1 ratio between the supply and discharge pressures, or they may be adjustably positioned to act at different points on the bell crank so as to maintain any desired ratio.

For obtaining a high operating efficiency of the furnace, there is provided control means for additionally regulating the valves 54 and 55 in the fuel lines so as to maintain a predetermined ratio between the total air flow and the total fuel supply to the burners. This control means includes a relay 105 having diaphragms 106 and 107 acting on opposite sides of one arm of a bell crank 108. Arranged in the fuel lines 8 and 9 are devices 110 and 111 for measuring the flow of fuel. Each of these devices may be like that disclosed in an application, Serial No. 555,258, filed September 22, 1944, for Paul S. Dickey et al., now Patent No. 2,459,689, and need not be described herein since it forms no part of the present invention. A device 112 is connected to the devices 110, 111 and operates to supply to a conduit 114 a pressure which is proportional to the difference between the measurements of fuel flow. It will be appreciated then that the pressure in the conduit 114 is directly proportional to the total fuel consumption at the burners. The pressure in the conduit 114 is subjected on the diaphragm 106 so as to urge the bell crank 108 in a clockwise direction. Arranged in the air passage 12 is an orifice 115, and pressures at opposite sides of the orifice are subjected through conduits 116 and 117 on a device 118 which operates in response to the differential pressures for supplying a pressure to a conduit 119 directly proportional to the total air flow to the furnace. The pressure in the conduit 119 is delivered to the diaphragm 107 for opposing the action of the diaphragm 106. A pilot valve 120 is connected to the bell crank 108 for controlling the supply of pressure through a conduit 121 to a chamber 122 of the relay 87. The pressure supplied to the chamber 122 aids the pressure in the chamber 86 for determining the pressure supplied through the conduit 88 to the diaphragm 57 and to the chamber 91 of the relay 92. As long as the ratio of the total fuel supply to the total air supply remains constant, the pressure supplied from the relay 105 to the chamber 122 will be held at some predetermined value, and the supply of fuel and air to the furnace will be varied only with changes in steam pressure. If the supply of fuel becomes too great for the amount of air supply, the pressures delivered to the diaphragms 106 and 107 will effect a positioning of the pilot valve 120 to decrease the pressure supplied to the chamber 122 of the relay 87. This relay then operates to decrease the pressure supplied through the conduit 88 so as to effect a closing of the valve 54 and an opening of the valve 55 for reducing the total fuel discharge from the burners until the ratio of total fuel to total air reaches the value at which the relay 105 is balanced. If the quantity of fuel discharged at the burners is insufficient for the air supply, the relay 105 is unbalanced in the opposite direction to increase the pressure delivered to the relay 87 and effect an increase in the pressure supplied to the diaphragms 56 and 57. The valve 54 is then opened and the valve 55 closed to increase the discharge of fuel from the burners.

As mentioned above, the connection of the burners 4, 5, 6 and 7 to the fuel lines 8 and 9 is controlled by mechanisms which are actuated when air is supplied under pressure to the cylinders 39 and 42. The solenoids 51 and 52 operate when energized to actuate the valve mechanisms 44 and 48 for supplying air to the left-hand ends of the cylinders so as to effect an operation of the link mechanisms to connect the burners to the fuel lines. A deenergizing of the solenoids results in a disconnection of the burners from the fuel lines. For controlling the energizing of the solenoids, there are provided pressure responsive switch mechanisms 125 and 126 subjected to the pressure in the conduit 114 through a conduit 127. Each of these switch mechanisms is designed to close at a predetermined maximum pressure and to open at a somewhat lower pressure. The pressures at which the switch 125 closes and opens are lower than those effecting closing and opening of the switch 126. A circuit 128 includes the solenoid 51 and is controlled by the switch 125, while a circuit 129 includes the solenoid 52 and is controlled by the switch 126.

Figure 3:
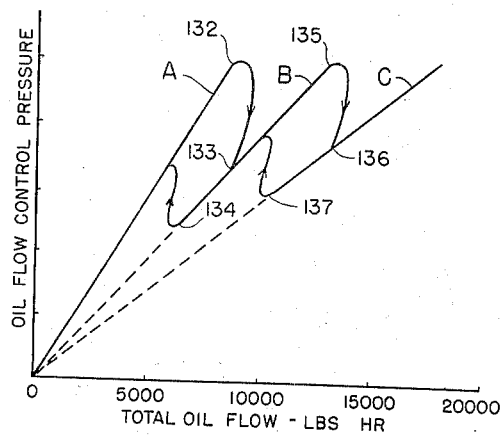
Fig. 3 shows curves indicating the relationship between total oil flow and the oil flow control pressure when different numbers of burners are connected to oil supply.

It will be seen that the burners 1, 2 and 3 are the only ones connected to the fuel lines when the demand for steam is very low. The pressure supplied to the diaphragms 56 and 57 at this time is comparatively low so that the valve 54 in the supply line is near its closed position and the valve 55 in the return line is almost fully opened. The pressures at the supply and discharge sides of the burners are low, and the quantity of fuel discharged from the burners is small. The total discharge of fuel from the burners is then represented by some point on curve A of Fig. 3. If the steam pressure drops, indicating an increase in demand, then the pilot valve 70 will be actuated by the Bourdon tube 68 to increase the pressure in the chamber 71 of the relay 72. This relay is then unbalanced to produce a continuing increase in the pressure supplied through the conduits 82 and 83 to the diaphragm 63 for opening the valve 62 to increase the supply of fluid to the power unit 60 driving the blower 11. Pressure fluid passes at the same time through the conduit 84 to the device 67 for opening the damper 65. The blower 11 driven at an increasing speed, and the opening of the damper 65 result in a continuing increase in air supply to the furnace. The increasing pressure in the conduit 82 is also supplied to the relay 87 for effecting its operation to increase the pressure supplied through the conduit 88 for moving the valves 54 and 55 in the fuel supply and return lines toward their open and closed positions, respectively. The pressures at the supply and discharge sides of the burners are increaseed by the operation of the valves 54, 55, and the fuel discharged from the burners is correspondingly increased. The amount of oil discharged at the burners is measured by the devices 110, 111, and the device 112 operates to increase the pressure in the conduit 114 in proportion to the increase in fuel consumption. The device 118 measures the total air flow to the furnace and produces a pressure in the conduit 119 proportional to such flow. If the fuel flow and air flow increase so that their ratio remains constant, the relay 105 remains balanced, and no change takes place in the pressure supply through the conduit 121 to the relay 87. An increase in the fuel flow and air flow by different amounts results in an operation of the relay 105 to change the pressure supplied to the relay 87 so as to regulate the pressure positioning the fuel valves 54, 55 in a manner to bring the ratio to the desired value.

As the control pressure acting on the diaphragms 56 and 57 increases, the discharge of fuel from the burners also increases. The relationship between the control pressure and the fuel discharged or total oil flow is indicated by curve A of Fig. 3. As soon as the demand for steam is satisfied, the Bourdon tube 68 returns the pilot valve to the position at which the relay 72 is balanced, and fuel and air continues to be supplied at the rates obtained when balance was reached. When the control pressure reaches a value at which the valves 54 and 55 are in their full open and closed positions, respectively, and the demand for steam has still not been satisfied, then it becomes necessary that additional burners be connected to the fuel lines. The pressure switch 125 is adjusted to close when the pressure in the conduit 114 reaches the value which is produced by the devices 110, 111 and 112 when the fuel discharged from the burners 1, 2 and 3 is approximately the highest that can be obtained with the pressures available. This is represented on curve A by the point 132 at the upper end of the straight line portion.

The operation of the switch 125 results in a supply of pressure to the left hand end of the cylinder 39 for opening the valves 21 and 26 to supply fuel to the burners 4 and 5. It will be appreciated that flow paths through the burners 4 and 5 are opened when the maximum pressures exist at their supply and discharge sides of the burners. With five burners discharging fuel, the total fuel consumption tends to increase. The rate of air flow to the burners has not changed, however, and so any increase in fuel consumption produces an unbalance of relay 105 to decrease the pressure supplied through the conduit 121 to the relay 87. This relay operates to produce a corresponding decrease in the pressure controlling the valves 54, 55, so that the latter operate to reduce the pressures at the supply and discharge sides of the burners until the oil flow is proportional to air flow. The control pressure for the valves 54, 55 is now lower than it was when the switch was made from 3 to 5 burners, but the total oil flow remains the same. The conditions existing at this time are represented by the point 133 on curve B of Fig. 3. If the demand drops off at this time, then operation continues on five burners with control pressure and oil flow following on curve B until a point 134 is reached. The pressure in the conduit 114 is low enough at this time to permit the switch 125 to operate and cut out the burners 4 and 5. Operation will not go back to five burners again until the point 132 on curve A is again reached.

If the demand is not satisfied when the burners 4 and 5 are first cut in, then operation follows on curve B until the point 135 is reached. At this time the valves 54 and 55 are approximately in their full opened and closed positions, respectively, to supply fuel to the burners at the maximum pressure available and the pressure in the conduit 114 has reached a value high enough to close the switch 126 for effecting an opening of the valves 30 and 35 to supply fuel to the burners 6 and 7. The discharge of fuel to the furnace tends to increase again, but such increase unbalances the relay 105 and effects a reduction of the control pressure to operate the valves 54, 55 for reducing flow. Operation then follows on seven burners along curve C either upwardly or downwardly from a point 136 depending on whether the demand continues to increase or to drop off. At point 137 the switch 126 opens to cut out the burners 6 and 7, and operation then follows curve B until the demand drops to the point 134 at which the burners 4 and 5 are cut out.

Figure 4:
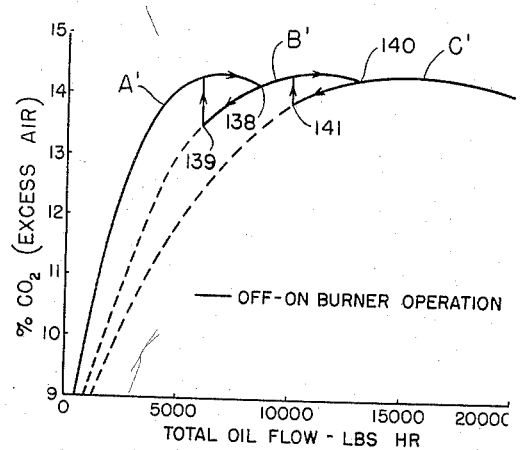
Fig. 4 shows curves indicating the relationship between total oil flow and excess air when different numbers of burners are connected to oil supply.

The curves of Fig. 4 represent the relationship between excess air and total fuel. Curves A', B' and C' represent operation on three, five and seven burners respectively. At the point 138, burners 4 and 5 are cut in and operation follows upwardly or downwardly on curve B' depending on whether the demand increases or decreases. If the demand drops off to obtain an operation at the point 139, then the burners 4 and 5 are cut out and operation returns to curve A'. At the point 140 the burners 6 and 7 are cut in and operation follows on curve C' either upwardly or downwardly from this point. At the point 141 the burners 6 and 7 are cut out and operation then follows on curve B' until the point 139 is reached.

For purging the burners 4, 5, 6 and 7 there is provided, as shown in Fig. 2, an air line 144 connected to the valve mechanisms 21 and 30 at points to communicate through the valve mechanisms with the burners when they are cut out of communication with the fuel supply and discharge lines.

While there is disclosed in this application one form which my invention may assume in practice, it will be understood that the invention may be modified and embodied in various other forms without departing from its spirit or the scope of the appended claims.

What I claim as new and desire to secure by Letters Patent of the United States, is:

1. A control system for a furnace having a plurality of burners of the return flow type adapted to communicate with fuel supply and return lines, including, in combination, valve means in each of said lines for controlling the flow of fuel therethrough, means operating in response to the demand on the furnace for controlling the valve means, said last mentioned means effecting an opening of the valve means in the supply line and a closing of the valve means in the return line on an increase in demand, means for connecting at least one of said burners continuously in communication with said fuel supply and return lines, valve means for controlling communication of said fuel supply and return lines with others of said burners, means for measuring the fuel discharged from said burners, and means operating in response to the measurement of fuel discharged for controlling said last mentioned valve means, said last mentioned means operating on an increase in the fuel discharged to a predetermined value for opening said last mentioned valve means.

2. The control system of claim 1 in which a plurality of valve means are provided for controlling communication of said fuel supply and return lines with others of said burners, and said means operating in response to the measurement of fuel discharged effects a sequential operation of said plurality of valve means at different measurements of discharge.

3. A control system for a furnace having a plurality of burners of the return flow type adapted to communicate with fuel supply and return lines including, in combination, pressure responsive valve means in said supply line movable toward its open position on an increase in the pressure supply thereto, pressure responsive valve means in said return line movable toward its closed position on an increase in the pressure supplied thereto, means for supplying fluid to each of said valve means at a pressure varying directly with the demand on the furnace, means for connecting at least one of said burners continuously in communication with said fuel supply and return lines; valve means for controlling communication of said fuel supply and return lines with others of said burners, means for measuring the fuel discharged from said burners, and means operating in response to the measurement of fuel discharged for controlling said last mentioned valve means, said last mentioned means operating on an increase in the fuel discharge to a predetermined value for opening said last mentioned valve means.

4. A control system for a furnace having a plurality of burners and means for supplying fuel and air thereto including, in combination, means for controlling the supply of fuel and air to said burners in response to the demand on the furnace, means for connecting at least one of said burners continuously in communication with said fuel supply means, valve means for controlling communication of said fuel supply means with others of said burners, means for measuring the total fuel consumed by said burners, means for controlling said valve means in response to the measurement of fuel consumed, said last mentioned means operating on an increase in the fuel measurement to a predetermined value for opening said valve means, means for measuring the air supplied to the furnace, and ratio means operating in response to the measurements of fuel and air for also regulating said means controlling the supply of fuel, said ratio means operating to effect a control of the fuel supply so as to maintain a constant ratio between the supply of fuel and air to the furnace.

5. A control system for a furnace having a plurality of burners and means for supplying fuel and air thereto including, in combination, pressure responsive valve means for controlling the supply of fuel, pressure responsive means for controlling the supply of air, means for supplying pressure fluid to each of said pressure responsive means in response to the demand on the furnace, means for connecting at least one of said burners continuously in communication with said fuel supply means, valve means for controlling communication of said fuel supply means with others of said burners, means for measuring the fuel discharged from said burners, means for controlling said valve means in response to the measurement of fuel discharged, said last mentioned means operating on an increase in the fuel measurement to a predetermined value for opening said valve means, means for measuring the air supplied to the furnace, and ratio means operating in response to the measurements of fuel and air for regulating the supply of pressure fluid to said fuel controlling means, said ratio means operating to effect a control of the fuel supply so as to maintain a constant ratio between the supply of fuel and air to the furnace.

6. A control system for a furnace having a plurality of burners and means for supplying fuel and air thereto including, in combination, pressure responsive means for controlling the supply of fuel, pressure responsive means for controlling the supply of air, means for supplying pressure fluid to each of said pressure responsive means in response to the demand on the furnace, means for connecting at least one of said burners continuously in communication with said fuel supply means, a plurality of valve means for controlling communication of said fuel supply means with others of said burners, means for measuring the fuel discharged from said burners, separate means for controlling said valve means in response to the measurement of fuel discharged, said last mentioned means operating on an increase in the fuel measurement to different predetermined values for opening said valve means, means for measuring the air supplied to the furnace, and ratio means operating in response to the measurements of fuel and air for regulating the supply of pressure fluid to said fuel controlling means, said ratio means operating to effect a control of the fuel supply so as to maintain a constant ratio between the supply of fuel and air to the furnace.

7. The control system of claim 6 in which said separate means operate to close said plurality of valve means on predetermined drops in the measurement of fuel flow below the values at which each of said valve means was opened.

8. A control system for a furnace having a plurality of burners of the return flow type adapted to communicate with fuel supply and return lines and having means for delivering air thereto including, in combination, means for connecting at least one of said burners continuously in communication with said fuel supply and return lines, valve means for controlling communication between others of said burners and said fuel supply and return lines, valve means in each of said fuel supply and return lines for controlling the flow of fuel therethrough, means for opening the valve means in the fuel supply line and closing the valve means in the fuel return line in response to an increase in demand on the furnace, means for increasing the supply of air to said air delivering means in response to an increase in the demand on the furnace, means for measuring the flow of fuel in the supply and return lines, means for controlling said first mentioned valve means in response to the difference between the flow measurements in the fuel lines, means for measuring the flow of air to the furnace, and means responsive to the measurement of air flow and the difference between the measurements of fuel flow for regulating the operation of the valve means in the fuel lines by changes in demand, said last mentioned means operating to maintain a predetermined ratio between the air flow and the difference between the measurements of fuel flow.

9. The system of claim 8 in which the means controlling the first mentioned valve means operates to open the latter when the difference between the measurements of flow in the fuel lines has increased to a predetermined value.

10. A control system for a furnace having a plurality of burners of the return flow type adapted to communicate with fuel supply and return lines and having means for delivering air thereto including, in combination, means for connecting at least one of said burners continuously in communication with said fuel supply and return lines, valve means for controlling communication between others of said burners and said fuel supply and return lines, pressure responsive valve means in each of said fuel lines for controlling the flow of fuel therethrough, the valve means in the fuel supply and return lines opening and closing, respectively, on an increase in the pressure supplied thereto, means for supplying fluid to said pressure responsive valve means at pressures varying directly with the demand on the furnace, pressure responsive means for varying the supply of air to said air delivering means in proportion to the pressures supplied thereto, means for supplying fluid to said pressure responsive means at pressures varying directly with the demand on the furnace, means for measuring the flow of fuel in the supply and return lines, means for controlling said first mentioned valve means in response to the difference between the flow measurements in the fuel lines, said last mentioned means operating to open the valve means on an increase in the measurement to a predetermined value, means for measuring the flow of air to the furnace, and means responsive to the measurements of air flow and the difference between the measurements of fuel flow for regulating the pressure supplied to said pressure responsive valve means, said last mentioned means operating to regulate the pressures to position the valve means in the fuel lines so as to maintain a predetermined ratio between the air flow and the difference between the measurements of fuel flow.

11. The system of claim 10 including means responsive to the pressure in each of said fuel lines and operating to regulate the pressure supplied to the pressure responsive valve means in one of said fuel lines so as to maintain a constant difference between the pressures in the fuel lines at the supply and discharge sides of said burners.

12. A control system for a vapor generator having a plurality of burners of the return flow type adapted to communicate with fuel supply and return lines and having means for delivering air thereto including, in combination, means for connecting at least one of said burners continuously in communication with said fuel supply and return lines, valves means for controlling communication between others of said burners and said fuel supply and return lines, pressure responsive valve means in each of said fuel lines for controlling the flow of fuel therethrough, the valve means in the fuel supply and return lines opening and closing, respectively, on an increase in the pressures supplied thereto, means operating in response to the pressure of the vapor generated for supplying fluid to said pressure responsive valve means at pressures varying inversely with the pressure of the generated vapor, pressure responsive means for varying the supply of air to said air delivering means in proportion to the pressure supplied thereto, means for supplying fluid to said pressure responsive means at pressures varying inversely with the pressure of the generated vapor, means for measuring the flow of fuel in the supply and return lines, means for establishing a pressure proportional to the difference between the measurements of fuel flow, means for controlling said first mentioned valve means in response to the pressure established by said last mentioned means, said controlling means operating to open said first mentioned valve means on an increase in the established pressure to a predetermined value and to close said first mentioned valve means on a drop in the pressure to a predetermined value below that at which the valve means was opened, means for measuring the flow of air to the vapor generator, means for establishing a pressure proportional to the measurements of air flow, and means responsive to both of the pressures established for regulating the pressure supplied to said pressure responsive valve means, said last mentioned means operating to regulate the pressure to position the valve means in the fuel lines so as to maintain a predetermined ratio between the air flow and the difference between the measurements of fuel flow.

13. The system of claim 12 including means responsive to the pressure in each of said fuel lines at the supply and discharge sides of said burners and operating to regulate the pressure supplied to the pressure responsive valve means in one of said fuel lines so as to maintain a constant difference between the pressures in the fuel lines at the supply and discharge sides of the burners.

PAUL S. DICKEY.

REFERENCES CITED

The following references are of record in the file of this patent:

UNITED STATES PATENTS

| Number | Name | Date |
|---|---|---|
| 2,057,539 | Russell | Oct. 13, 1936 |
| 2,127,172 | Hermitte | Aug. 16, 1938 |
| 2,390,806 | Nagel | Dec. 11, 1945 |
| 2,412,739 | McCracken | Dec. 17, 1946 |
| 2,433,725 | Ziebolz | Dec. 30, 1947 |